US010636287B2

(12) United States Patent
Honda et al.

(10) Patent No.: US 10,636,287 B2
(45) Date of Patent: Apr. 28, 2020

(54) AUTOMATIC INSPECTION SYSTEM AND AUTOMATIC INSPECTION METHOD

(71) Applicant: HITACHI, LTD., Tokyo (JP)

(72) Inventors: Jumpei Honda, Tokyo (JP); Takuma Nishimura, Tokyo (JP); Yoshimi Fujimata, Tokyo (JP); Hiroshige Kashiwabara, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 16/462,951

(22) PCT Filed: Nov. 6, 2017

(86) PCT No.: PCT/JP2017/039938
§ 371 (c)(1),
(2) Date: May 22, 2019

(87) PCT Pub. No.: WO2018/123270
PCT Pub. Date: Jul. 5, 2018

(65) Prior Publication Data
US 2019/0279498 A1 Sep. 12, 2019

(30) Foreign Application Priority Data

Dec. 27, 2016 (JP) ................................ 2016-253635

(51) Int. Cl.
*G08C 17/00* (2006.01)
*H04Q 9/00* (2006.01)
(Continued)

(52) U.S. Cl.
CPC ............. *G08C 17/00* (2013.01); *G08C 15/00* (2013.01); *G08C 15/06* (2013.01); *H04Q 9/00* (2013.01);
(Continued)

(58) Field of Classification Search
CPC ........ G08C 17/00; G08C 15/00; G08C 15/06; H04W 4/38; H04W 52/02;
(Continued)

(56) References Cited

U.S. PATENT DOCUMENTS 10,045,291 B2 * 8/2018 Mani ...................... H04W 4/80
10,075,233 B2 * 9/2018 Pechner ............ H03M 13/3769

FOREIGN PATENT DOCUMENTS

JP 07-198331 A 8/1995
JP 2004-318301 A 11/2004
(Continued)

OTHER PUBLICATIONS

International Search Report of PCT/JP2017/039938 dated Jan. 30, 2018.

*Primary Examiner* — Franklin D Balseca
(74) *Attorney, Agent, or Firm* — Mattingly & Malur, PC

(57) ABSTRACT

An automatic inspection system, which includes a wireless slave device having a reading device that acquires a physical quantity to be inspected and a wireless master device that receives measurement data of the physical quantity from the wireless slave device, is provided with a data collection device that collects the measurement data from the wireless slave device via the wireless master device in a constant cycle and detects a time zone in which the measurement data is non-acquirable by the reading device based on a result of the collection. The wireless master device performs control to avoid the wireless slave device from re-acquisition of the measurement data in the non-acquirable time zone based on a result of the detection of the non-acquirable time zone.

5 Claims, 11 Drawing Sheets

(51) Int. Cl.

| | |
|---|---|
| *H04W 52/02* | (2009.01) |
| *H04W 84/18* | (2009.01) |
| *H04W 4/38* | (2018.01) |
| *G08C 15/00* | (2006.01) |
| *G08C 15/06* | (2006.01) |
| *H04W 74/04* | (2009.01) |

(52) U.S. Cl.
CPC ............ *H04W 4/38* (2018.02); *H04W 52/02* (2013.01); *H04W 52/0203* (2013.01); *H04W 74/04* (2013.01); *H04W 84/18* (2013.01); *H04Q 2209/00* (2013.01); *H04Q 2209/40* (2013.01); *H04Q 2209/75* (2013.01); *Y02D 70/00* (2018.01)

(58) Field of Classification Search
CPC . H04W 52/0203; H04W 74/04; H04W 84/18; H04Q 9/00; H04Q 2209/00; H04Q 2209/10; H04Q 2209/20; H04Q 2209/25; H04Q 2209/40; H04Q 2209/60; H04Q 2209/70; H04Q 2209/75; H04Q 2209/753; H04Q 2209/756; Y02D 70/00
See application file for complete search history.

(56) References Cited

FOREIGN PATENT DOCUMENTS

| | | |
|---|---|---|
| JP | 2006-352407 A | 12/2006 |
| JP | 2009-282627 A | 12/2009 |
| JP | 2011-060067 A | 3/2011 |
| JP | 2015-114956 A | 6/2015 |

\* cited by examiner

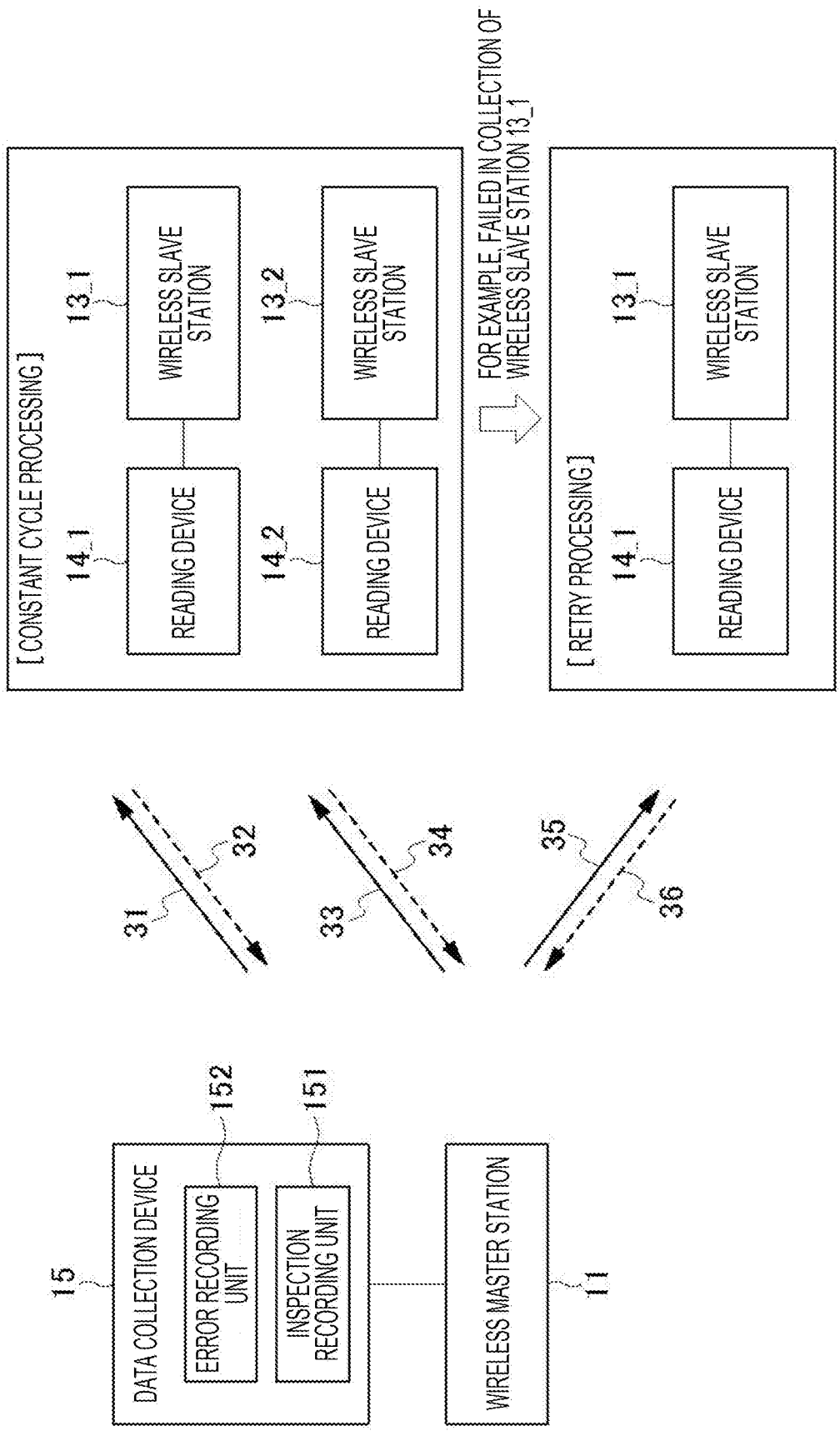

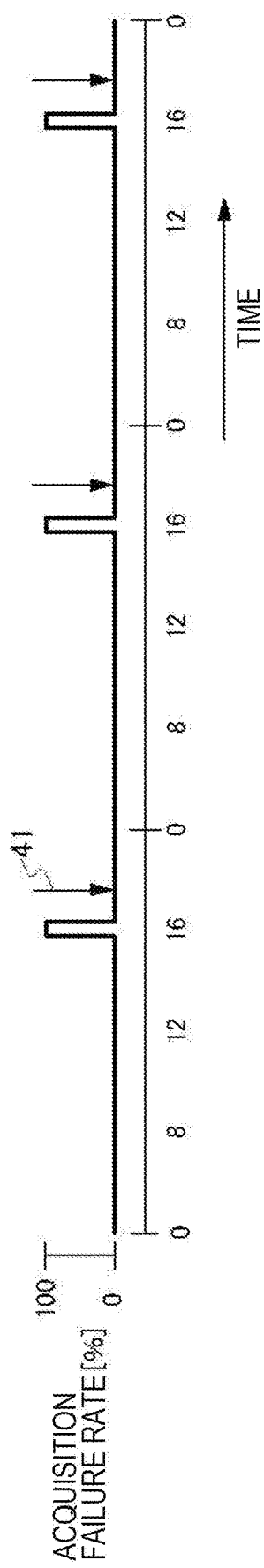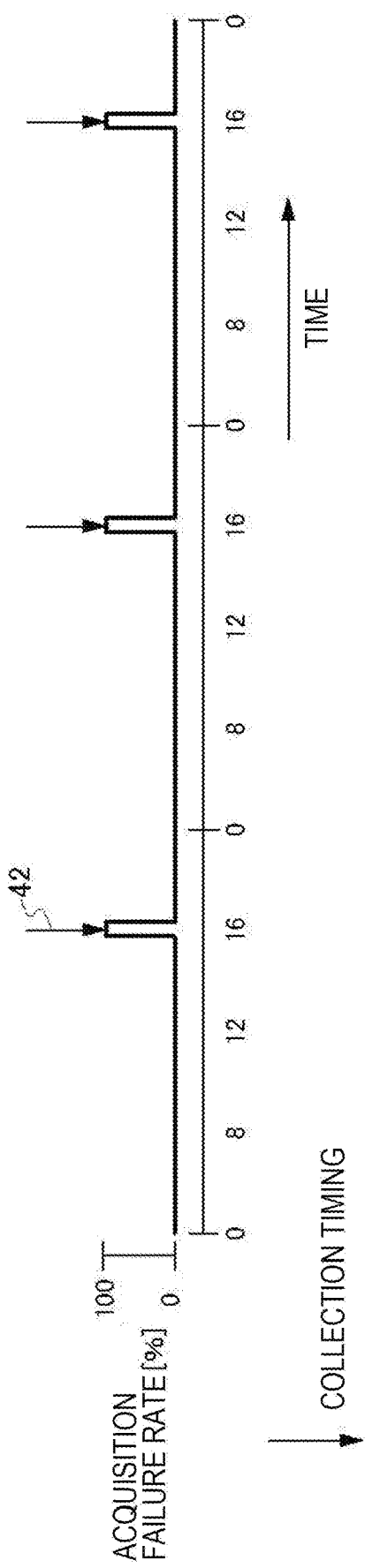

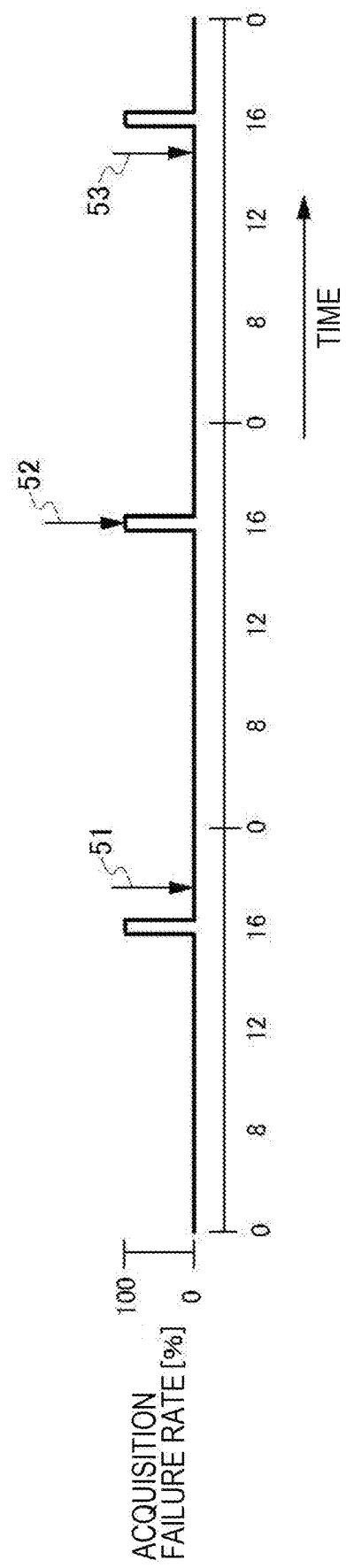

AUTOMATIC INSPECTION SYSTEM AND AUTOMATIC INSPECTION METHOD

TECHNICAL FIELD

The present invention relates to an automatic inspection system and an automatic inspection method.

BACKGROUND ART

On-site facilities such as power plants and plants are provided with a large number of measuring instruments (for example, needle-type meters) that measure physical quantities such as the amount of water flowing through a pipe. These measuring instruments have been used for facility inspections performed by human visual observation in a cycle of about several times a day or more frequently. In maintenance and inspection work, however, problems have arisen such as aging of inspection workers and securing of personnel.

From this viewpoint, a system, which images a display unit of a measuring instrument with a camera and transmits such captured image data via a wireless network, is developed to obtain automation of inspection work (see, for example, PTL 1). PTL 1 states that "it relates to a meter reading method by image processing suitable for accurately reading positions of pointers of meters in the image processing using a monitor television camera".

Further, there is a technique of suppressing an increase in communication time in a wireless meter reading system using a wireless communication network by performing retry (re-transmission) of communication in a wireless master station when communication between a portable master device and a wireless slave station (wireless slave device) fails (see, for example, PTL 2). PTL 2 states that "the portable master device transmits a batch meter reading request telegram to the wireless slave stations, and receives response telegrams for the batch meter reading request telegram from the respective wireless slave stations. The portable master device determines and classifies each failure cause when the communication fails for each of the wireless slave stations from which the response telegram has not been received, and performs retry (re-transmission) by batch communication for each classification".

CITATION LIST

Patent Literature

PTL 1: JP H07-198331 A
PTL 2: JP 2009-282627 A

SUMMARY OF INVENTION

Technical Problem

PTL 1 discloses a technique of reading a meter pointer position of a flowmeter or the like by image analysis. PTL 2 discloses the technique of suppressing the increase in communication time caused by the retry of communication. In the conventional techniques described in PTL 1 and PTL 2, however, there is no consideration on reduction of an energy loss based on actual operation in situations where the measurement may be possible or impossible in a reading device that measures a physical quantity, that is, low power consumption of a network.

An object of the present invention is to provide an automatic inspection system and an automatic inspection method capable of realizing reduction in power consumption of a network when performing communication between a wireless master station and a wireless slave station using a wireless network.

Solution to Problem

In order to achieve the above object, an automatic inspection system of the present invention is an automatic inspection system using a wireless network which includes a wireless slave device having a reading device that acquires a physical quantity to be inspected, and a wireless master device that receives measurement data of the physical quantity acquired by the reading device from the wireless slave device by wireless communication.

Further, the automatic inspection system includes a data collection device that collects the measurement data from the wireless slave device via the wireless master device in a constant cycle and detects a time zone in which the measurement data is non-acquirable by the reading device based on a result of the collection. The wireless master device is characterized by performing control to avoid the wireless slave device from re-acquisition of the measurement data in the non-acquirable time zone based on a result of the detection of the non-acquirable time zone.

Further, an automatic inspection method of the present invention is an automatic inspection method using a wireless network which includes a wireless slave device having a reading device that acquires a physical quantity to be inspected, and a wireless master device that receives measurement data of the physical quantity acquired by the reading device from the wireless slave device by wireless communication.

Further, the automatic inspection method is characterized by: collecting the measurement data from the wireless slave device via the wireless master device in a constant cycle and detecting a time zone in which the measurement data is non-acquirable by the reading device based on a result of the collection; and avoiding the wireless slave device from re-acquisition of the measurement data in the non-acquirable time zone by the wireless master device based on a result of the detection of the non-acquirable time zone.

Advantageous Effects of Invention

According to the present invention, it is possible to suppress an energy loss caused by re-acquisition by avoiding the re-acquisition of the measurement data in the non-acquirable time zone, and thus, it is possible to realize low power consumption of the network.

BRIEF DESCRIPTION OF DRAWINGS

FIG. 4 is an example of an operation explanatory diagram for describing an inspection operation of the automatic inspection system according to the embodiment of the present invention.

FIG. 5 is an example of a timing chart for describing an operation in a case where a collection schedule is data collection in a 24-hour cycle (constant cycle collection).

FIG. 6 is an example of a timing chart for describing an operation of the automatic inspection system according to Example 1.

DESCRIPTION OF EMBODIMENTS

Figure 1:
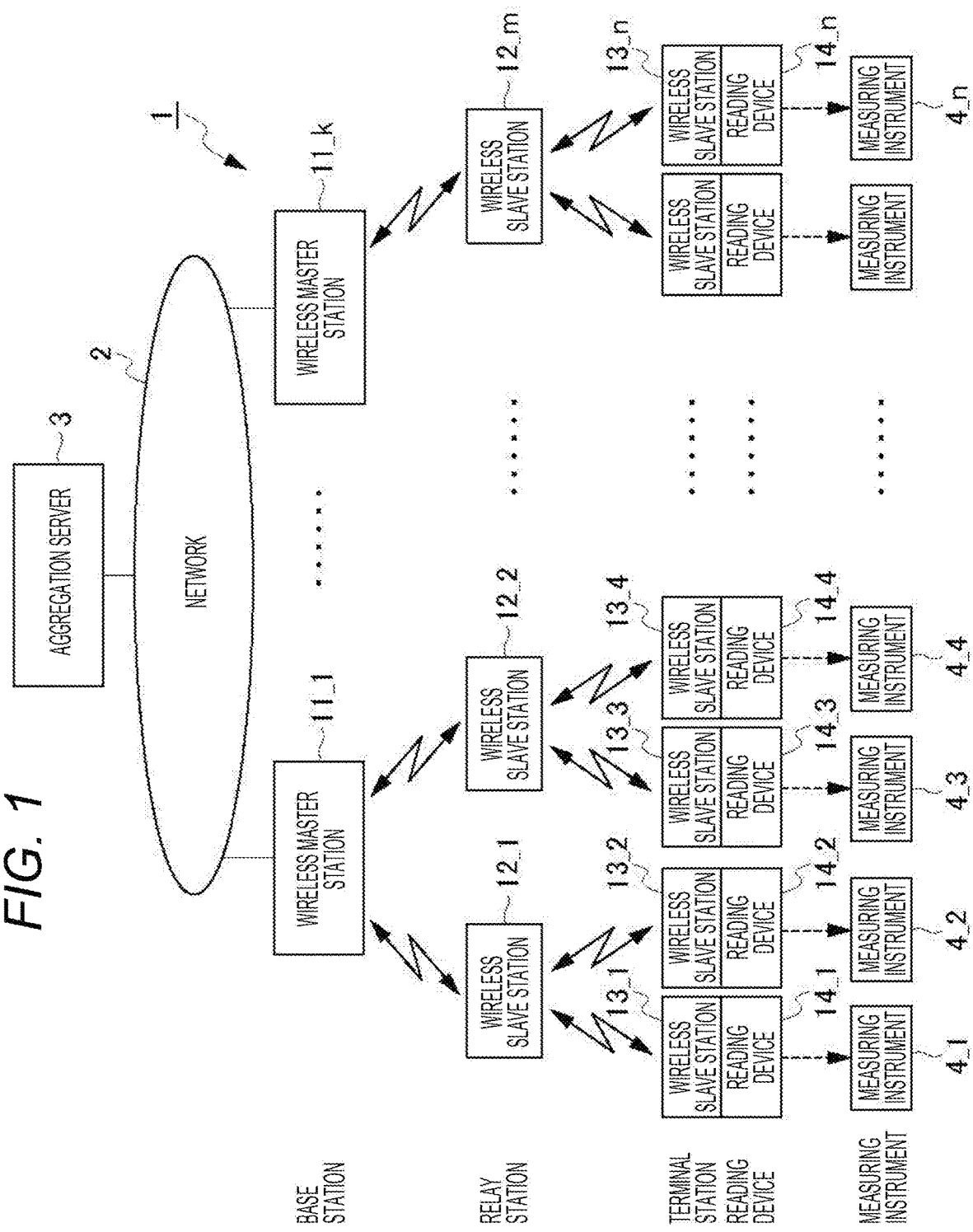
FIG. 1 is an example of a system configuration diagram illustrating an outline of a basic configuration of a multi-hop wireless network.

Hereinafter, modes for carrying out the present invention (hereinafter referred to as "embodiments") will be described in detail with reference to the drawings. The present invention is not limited to the embodiments. Incidentally, the same reference numerals will be used for the same elements or elements having the same functions in the following description and drawings, and redundant descriptions will be omitted.

In the present invention, a multi-hop wireless network (a sensor wireless network using multi-hopping) is preferably used as a wireless network including a wireless slave station and a wireless master station to obtain automation of an inspection of a measuring instrument that measures a physical quantity to be inspected. The multi-hop wireless network is a wireless network in which a plurality of wireless terminals transmits data via other neighboring wireless terminals by a so-called bucket relay system. Examples of the measuring instrument that measures the physical quantity to be inspected includes meters (for example, needle-type meters) such as a flow meter, a wattmeter, an ammeter, a manometer, and a thermometer.

[Multi-Hop Wireless Network]

Here, an outline of a basic configuration of the multi-hop wireless network will be described with reference to FIG. 1. FIG. 1 is an example of a system configuration diagram illustrating the overview of the basic configuration of the multi-hop wireless network.

A multi-hop wireless network 1 according to this example includes k wireless master stations 11_1 to 11_k (hereinafter referred to as a "wireless master station 11" as a representative in some cases) as base stations. These wireless master stations 11_1 to 11_k are connected to an aggregation server 3 via a network 2. A connection form of the wireless master stations 11_1 to 11_k with respect to the network 2 is not particularly limited, and may be a wired connection or a wireless connection.

The wireless master stations 11_1 to 11_k are provided with M wireless slave stations 12_1 to 12_m (hereinafter referred to as a "wireless slave station 12" as a representative in some cases) as relay stations. Further, n wireless slave stations 13_1 to 13_n (hereinafter referred to as a "wireless slave station 13" as a representative in some cases) are provided as terminal stations (slave stations at a terminal layer of a hierarchy). That is, when the wireless master stations 11_1 to 11_k communicate with the wireless slave stations 13_1 to 13_n at the terminal layer of the hierarchy, the wireless slave stations 12_1 to 12_m located in the middle thereof function as relay stations. For example, when a certain wireless master station 11_1 communicates with a certain wireless slave station 13_2, a wireless slave station located in the middle of the multi-hop wireless network 1 (the wireless slave station 12_1 in this example) serves as a relay station to perform the communication.

Further, in an automatic inspection system using the multi-hop wireless network 1, the terminal wireless slave stations 13_1 to 13_n are provided with reading devices 14_1 to 14_n (hereinafter referred to as a "reading device 14" as a representative in some cases), respectively, that acquire measurement values of measuring instruments 4_1 to 4_n (hereinafter referred to as a "measuring instrument 4" as representative in some cases) which measure physical quantities to be inspected. As the measuring instruments 4_1 to 4_n, meters such as a flow meter that measures a flow rate of water, a liquid, or the like and wattmeter that measures the amount of electric power can be exemplified.

As the reading devices 14_1 to 14_n, for example, cameras using a solid-state imaging device, such as a charge coupled device (CCD) image sensor and a complementary metal oxide semiconductor (CMOS) image sensor, as an imaging device can be used. In this case, the reading devices 14_1 to 14_n read the measurement values of the measuring instruments 4_1 to 4_n from images of the measuring instruments 4_1 to 4_n captured by the cameras. However, the reading devices 14_1 to 14-n are not limited to the cameras. For example, any device, which is capable of measuring a physical quantity to be inspected, such as a meter that converts the physical quantity to be inspected into an electrical signal such as a current and a voltage and measures the electrical signal in conjunction with the measuring instruments 4_1 to 4_n, may be used.

The terminal wireless slave stations 13_1 to 13_n transmit measurement results of the measuring instruments 4_1 to 4_n acquired by the reading devices 14_1 to 14_n to the wireless master stations 11_1 to 11_k via the wireless slave stations 12_1 to 12_m which are relay stations located in the middle of the multi-hop wireless network 1.

In this example, a hierarchical structure of two layers of the relay station and the terminal station has been exemplified as the wireless slave stations, the invention is not limited to the two layers but may be a hierarchical structure of three or more layers. Further, when the wireless master stations communicates with the wireless slave stations in the terminal layer of the hierarchy, the plurality of wireless slave stations located in the middle of the multi-hop wireless network 1 functions as the relay stations as described above. At this time, not only the wireless slave stations at the terminal layer of the hierarchy, which is a communication counterparts, but also the plurality of wireless slave stations in the middle thereof is activated to consume electric power.

The multi-hop wireless network 1 described above has an advantage that a communication range that can be covered by one data collecting station (the wireless master station 11 or the aggregation server 3) can be expanded by sequentially moving data between wireless terminals. Further, it is possible to eliminate a dead zone of wireless waves by setting up a multi-hop relay route so as to avoid an area with a bad wireless environment, and thus, there is also an advantage that it is possible to contribute to high reliability of data transmission.

In the multi-hop wireless network 1, there is a case where the wireless slave station 13 and the reading device 14 are installed in a place where it is difficult to supply power from the outside. In such a case, a self-sustaining power source such as a battery is used as a power source of the wireless slave station 13 and the reading device 14. This is because cost is required for electric facilities in order to wire a feeder over a long distance or install an outlet when a commercial power source is used as a power source of the wireless slave station 13 installed in the place where power supply is difficult, thereby increasing the cost of the multi-hop wireless network 1.

In this manner, there is a demand for low power consumption in the multi-hop wireless network 1, particularly the multi-hop wireless network 1 using the self-sustaining power source as the power source of the wireless slave station 13 and the reading device 14 in order to operate the wireless slave station 13 and the reading device 14 over a long time with the self-sustaining power source such as the battery. However, the reduction of the power consumption of the multi-hop wireless network 1 is not a technical problem limited only when the wireless terminal is operated by the self-sustaining power source.

Meanwhile, when the wireless master stations 11 communicates with the terminal wireless slave stations 13 in the multi-hop wireless network 1, a communication operation is performed by hopping (transfer by reception and transmission in the unit of a packet) of the plurality of wireless slave stations 13. Therefore, in order to suppress the power consumption of the wireless slave station 13, particularly, it is preferable (advantageous) that a frequency of communication with the terminal wireless slave station 13 having many hops (the number of relay stations to reach the wireless master station 11) be low.

Meanwhile, when data is transmitted between the wireless master station 11 and the wireless slave station 13 via the multi-hop wireless network 1, there is a case where acquisition of a measurement value of the measuring instrument 4 by the reading device 14 fails in a certain wireless slave station 13. As an example, when the reading device 14 acquires the measurement value of the measuring instrument 4 by imaging using the camera, there is a case where acquisition of the measurement value of the measuring instrument 4 by the reading device 14 fails under an environment where it is difficult to capture an appropriate image due to influence, for example, condensation, rain, reflection by the setting sun, or the like.

In this manner, when the acquisition of the measurement value of the measuring instrument 4 by the reading device 14 fails, re-attempt (re-acquisition/retry) of acquiring a measurement value is performed. When this retry is performed, the reading device 14 re-acquires (re-measures) a measurement value. Therefore, in order to reduce the energy loss of the self-sustaining power source, it is preferable advantageous) that the number of retries for re-acquiring the measurement value of the measuring instrument 4 be small.

Further, when the acquisition of the measurement value of the measuring instrument 4 by the reading device 14 fails due to any factor (for example, reflection by the setting sun), there is a low possibility that the factor is immediately eliminated. Therefore, if the wireless master station 11 immediately issues a retry request to the wireless slave station 13, two-way communication is newly generated including the wireless slave station 12 that also operates as the relay station, and thus, an increase in the energy loss spreads throughout the entire wireless network. In addition, retry caused by an acquisition error of a measurement value frequently occurs, and the energy loss caused by the reading device 14 increases.

Meanwhile, the terminal wireless slave station 13 is normally placed in a sleep state which is a power saving mode, and is activated only when data is transferred or when the reading device 14 operates to acquire a measurement value of the measuring instrument 4. However, if the retry caused by the measurement value acquisition error frequently occurs, activation and stop are repeated for each retry in the wireless slave station 13, and thus, power is consumed by the corresponding amount. In other words, the activation and stop are repeated for each retry during a period in which the wireless slave station 13 is originally in the sleep state and power is not consumed so that the period in which the wireless slave station 13 is in the sleep state becomes shorter and the power consumption increases.

Embodiment of Present Invention

As described above, there is the demand for low power consumption in the multi-hop wireless network 1 which is an example of the wireless network, particularly the multi-hop wireless network 1 using the self-sustaining power source, such as the battery, as the power source for the wireless slave station 13 and the reading device 14. Therefore, in the embodiment of the present invention, the retry (re-acquisition) accompanying the acquisition error of measurement data (the measurement value) by the reading device 14 is avoided in a time zone in which measurement data is non-acquirable and the energy loss due to the retry is reduced, thereby realizing the low power consumption of the network.

Hereinafter, a detailed description will be given regarding the embodiment of the present invention which realizes the low power consumption of the multi-hop wireless network 1 by avoiding the re-acquisition (retry) accompanying the acquisition error in the time zone in which measurement data is non-acquirable in the automatic inspection system which automatically inspects the measuring instruments 4_1 to 4_n using the multi-hop wireless network 1.

Figure 2:
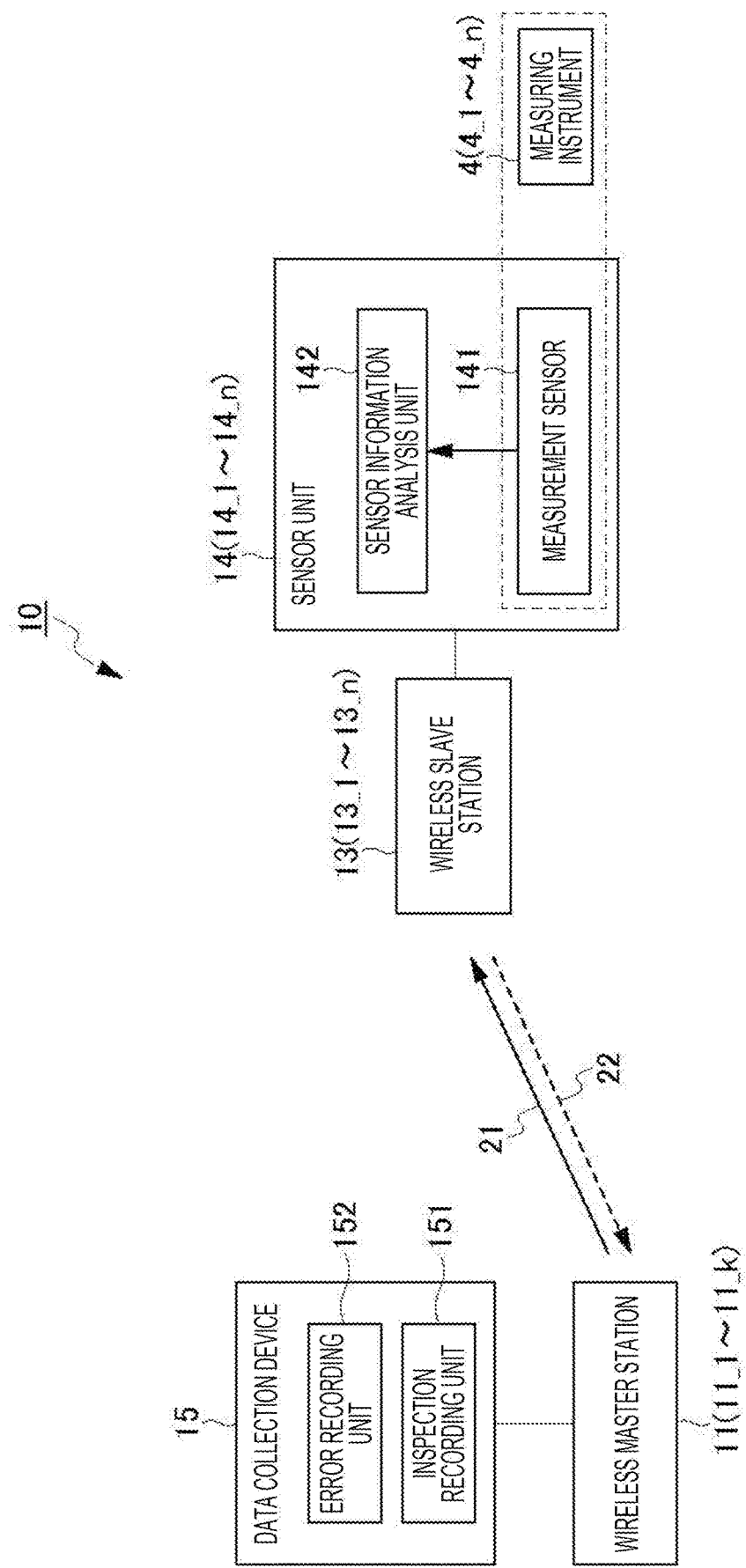
FIG. 2 is an example of a block diagram illustrating a configuration of a main part of an automatic inspection system according to an embodiment of the present invention.

FIG. 2 is an example of a block diagram illustrating a configuration of a main part of the automatic inspection system according to the embodiment of the present invention. In the present embodiment, a needle-type meter, which measures a physical quantity by a needle and a dial (scale board), can be used as the measuring instrument 4 (4_1 to 4_n). However, the invention is not limited to the needle-type meter.

FIG. 2 schematically illustrates a system configuration in the case of performing communication between the wireless master station 11 (11_1 to 11_k), which is a certain base station, and the wireless slave station 13 (13_1 to 13_n) which is a certain terminal station. Further, the relay stations (wireless slave stations 12_1 to 12_m in FIG. 1) interposed between the wireless master station 11 and the wireless slave station 13 are not illustrated for ease of understanding.

As illustrated in FIG. 2, an automatic inspection system 10 according to the present embodiment is configured such that the wireless master station 11 includes a data collection device 15 in addition to the fact that the wireless slave station 13 includes the reading device 14. A connection form of the data collection device 15 with respect to the wireless master station 11 is not particularly limited, and may be a wired connection or a wireless connection. Similarly, a connection form of the reading device 14 with respect to the wireless slave station 13 is not particularly limited, and may be a wired connection or a wireless connection.

Incidentally, a case where the data collection device 15 is arranged at a position of the wireless master station 11 is exemplified here, but the invention is not limited thereto. That is, the data collection device 15 may be arranged at the position of the wireless master station 11 when a user collects data at the position of the wireless master station 11, or the data collection device 15 may be arranged at a position of the aggregation server 3 when the user collects data at the position of the aggregation server 3 illustrated in FIG. 1.

In FIG. 2, the solid line arrow indicates a request 21 for data transmission transmitted from the wireless master station 11 to the wireless slave station 13, and the broken line arrow indicates a response 22 transmitted from the wireless slave station 13 to the wireless master station 11 in response to the request 21 from the wireless master station 11. This response 22 also includes a cause of an acquisition error of a measurement value of the measuring instrument 4 by the reading device 14.

The reading device 14 is a device that reads (acquires) the measurement value of the measuring instrument 4 such as a flow meter, a wattmeter, an ammeter, a manometer, and a thermometer. The reading device 14 is configured as an electronic circuit device which has hardware resources such as a microprocessor, a memory, an input/output unit, and a battery (none of which are illustrated). The reading device 14 includes, for example, a measurement sensor 141 and a sensor information analysis unit 142.

The measurement sensor 141 is configured using, for example, an image sensor, outputs image data obtained by capturing the measuring instrument 4, and supplies the image data to the sensor information analysis unit 142. However, the measurement sensor 141 is not limited to the image sensor, but may be of any kind (type) as long as it is configured to be capable of reading a physical quantity to be inspected. The sensor information analysis unit 142 reads the measurement value of the measuring instrument 4 by analyzing (performing data analysis) the image data supplied from the measurement sensor 141.

The wireless slave station 13 transmits the measurement value of the measuring instrument 4 read by the reading device 14 to the wireless master station 11 as measurement data and transmits the response 22 indicating a data analysis result in the sensor information analysis unit 142 to the wireless master station 11. The response 22 from the wireless slave station 13 to the wireless master station 11 includes a response that there is no failure in data analysis by the sensor information analysis unit 142, a response that data analysis has failed, or a response that a measurement value has not been received from the measurement sensor 141.

The data collection device 15 is configured as a computer or a dedicated electronic circuit device which includes, for example, hardware resources such as a microprocessor, a memory, an auxiliary storage device, an input/output unit (none of which are illustrated) and software resources such as an operating system and a computer program. The data collection device 15 includes, for example, an inspection recording unit 151 and an error recording unit 152.

The data collection device 15 saves the response that there is no failure in data analysis in the inspection recording unit 151, and saves the response that the data analysis has failed or the response that the measurement value has not been received from the measurement sensor 141 in the error recording unit 152.

Figure 3:
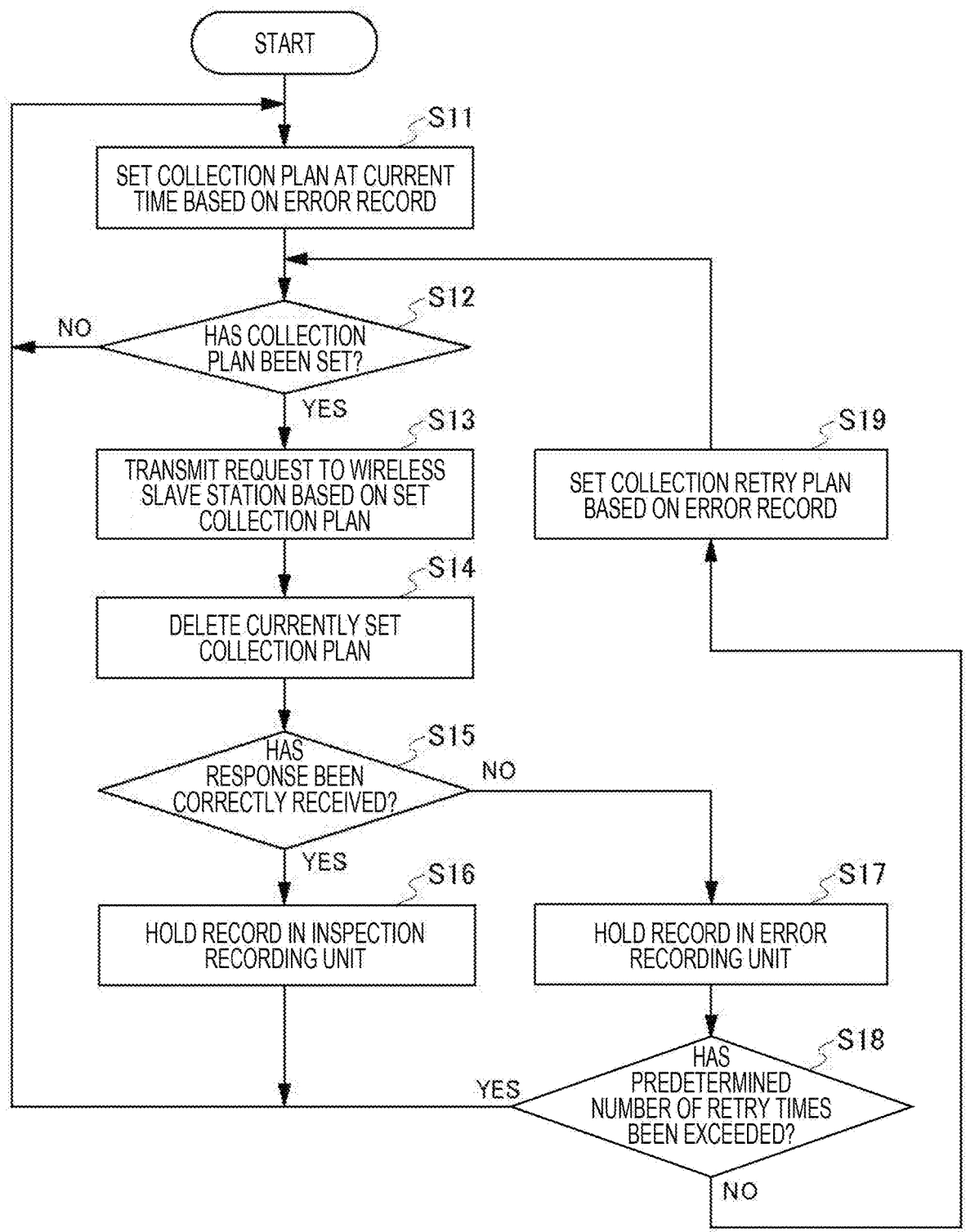
FIG. 3 is an example of a flowchart illustrating flow of data collection processing in a data collection device in the automatic inspection system according to the embodiment of the present invention.

Hereinafter, a process of collecting data in the data collection device 15 will be described with reference to a flowchart of FIG. 3. FIG. 3 is an example of the flowchart illustrating flow of data collection processing in the data collection device 15. Incidentally, this processing is loop processing to wait for the next constant cycle processing.

Here, a data collection processing function in the data collection device 15 will be described by exemplifying a case where the function is realized as a microprocessor interprets and executes a program that realizes the function. In this case, a series of processes to be described hereinafter will be executed under control performed by the microprocessor.

The microprocessor sets a collection plan at a current time based on accumulated data in the error recording unit 152, that is, an error record (Step S11), and then, determines whether the collection plan has been set (Step S12). Here, when the collection plan has not been set (NO in S12), the microprocessor returns to Step S11 and waits until setting of a collection plan of the next time is performed.

When the collection plan has been set (YES in S12), the microprocessor transmits a data collection request (the request 21 in FIG. 2) to the wireless slave station 13 via the wireless master station 11 based on the set collection plan (Step S13). Next, the microprocessor deletes the currently set collection plan (Step S14), and then, determines whether a response (the response 22 in FIG. 2) from the wireless slave station 13 has been correctly received (Step S15).

If the response has been correctly received (YES in S15), the microprocessor saves a record of the data collection in the inspection recording unit 151 (Step S16), and then, the processing returns to Step S11. If the response has not been correctly received (NO in S15), the microprocessor saves a data collection result in the error recording unit 152 (Step S17). Next, the microprocessor determines whether a request for re-acquisition (retry) of data collection to the wireless slave station 13 that has failed in data collection exceeds a predetermined number of times of retry (Step S18).

Further, if the predetermined number of times of retry has been exceeded (YES in S18), the microprocessor returns to Step S11 and waits for the next constant cycle processing. On the other hand, if the predetermined number of times of retry has not been exceeded (NO in S18), the microprocessor sets a data collection retry plan based on the accumulated data in the error recording unit 152 (Step S19), and then, proceeds to Step S12 and transmits again a data collection request to the wireless slave station 13 from which the response 22 of FIG. 2 has not been correctly received.

As described above, the re-acquisition (retry) of measurement data by the reading device 14 is not performed in a system in response to a case where the response from the wireless slave station 13 (response 22 in FIG. 2) has failed in terms of time in the data collection processing in the data collection device 15. As a result, it is possible to suppress the power consumption of the multi-hop wireless network 1 and the automatic inspection system 10 according to this embodiment.

Next, an inspection operation of the automatic inspection system 10 according to the present embodiment having the above configuration will be described with reference to FIG. 4. FIG. 4 is an example of an operation explanatory diagram for describing the inspection operation of the automatic inspection system 10 according to the present embodiment.

Here, as an example, a description will be given by exemplifying a case where two wireless slave stations 13_1 and 13_2 are set as targets of data collection processing in a constant cycle and data analysis (data acquisition) by the sensor information analysis unit 142 fails on the wireless slave station 13_1 side.

The data collection device 15 instructs the wireless master station 11 to collect data of a measurement value of the measuring instrument 4 to be measured and inspected, acquired by the reading device 14, in accordance with a collection schedule set in advance. When receiving this instruction, the wireless master station 11 transmits a request 31 of data transmission to the wireless slave station 13_1. When receiving the request 31, the wireless slave station 13_1 activates the reading device 14_1 and attempts to acquire measurement data of the measuring instrument 4 obtained by sensing by the measurement sensor 141. At this time, since the data analysis in the sensor information analysis unit 142 has failed, the wireless slave station 13_1 stops the reading device 14_1, and then, transmits a response 32 indicating that the data analysis has failed to the wireless master station 11.

Next, the wireless master station 11 transmits a request 33 of data transmission to the wireless slave station 13_2 when receiving the data collection instruction from the data collection device 15. When receiving this request 33, the wireless slave station 13_2 activates the reading device 14_2 and acquires the measurement data of the measuring instrument 4 obtained by sensing by the measurement sensor 141. Further, the wireless slave station 13_2 stops the reading device 14_2, and then, transmits a response 34 including the measurement data to the wireless master station 11.

When receiving the response 32 from the wireless slave station 13_1 and the response 34 from the wireless slave station 13_2, the wireless master station 11 supplies (transmits) reception results thereof to the data collection device 15. Then, the data collection device 15 saves the response 34 that there is no failure in data analysis (data acquisition), received from the wireless slave station 13_2, in the inspection recording unit 151 and saves the response 32 that the data analysis has failed, received from the wireless slave station 13_1, in the error recording unit 152.

Further, the data collection device 15 instructs re-acquisition (retry) of measurement data to the wireless master station 11 so as to re-perform (re-attempt) the acquisition of measurement data with respect to the wireless slave station 13_1 from which data collection has been failed. When receiving this instruction, the wireless master station 11 transmits a request 35 of data transmission to the wireless slave station 13_1 from which previous data collection has been failed. When receiving this request 35, the wireless slave station 13_1 activates the reading device 14_1 and acquires measurement data of the measuring instrument 4.

Further, the wireless slave station 13_1 stops the reading device 14_1, and then, transmits a response 36 including the measurement data to the wireless master station 11. When receiving the response 36 from the wireless slave station 13_1, the wireless master station 11 supplies a reception result thereof to the data collection device 15. Then, the data collection device 15 saves the response 36 that data acquisition has been successful by the current retry, received from the wireless slave station 13_1, in the inspection recording unit 151.

Meanwhile, if retry caused by an acquisition error of measurement data frequently occurs, the power consumption of the multi-hop wireless network 1 increases since the activation and stop are repeated for each retry in the wireless slave station 13 as described above. Therefore, it is preferable to avoid the retry (re-acquisition of measurement data) in a time zone in which measurement data is non-acquirable from the viewpoint of achieving reduction of the power consumption of the multi-hop wireless network 1.

Here, a case where a collection schedule is data collection in a constant cycle (constant cycle collection) will be described with reference to FIG. 5. FIG. 5 is an example of a timing chart for describing an operation when the collection schedule is data collection in a constant cycle. In FIG. 5, the downward arrow (1) in the drawing indicates a collection timing of measurement data. The collection timing referred to herein includes not only an instantaneous timing but also a timing at which retry is repeatedly executed in a constant cycle within a certain period of time. The same description also applies to the following Examples.

In this example, the data collection device 15 instructs the wireless master station 11 to collect data in accordance with a collection schedule of a 24-hour cycle as an example. Further, the time at which acquisition of measurement data fails is set to, for example, 16 o'clock. In the case of this example, an acquisition failure rate is 100[%] in the time zone of 16 o'clock as illustrated in FIGS. 5A and 5B. A time zone about 16 o'clock is a time zone in which the reading device 14 is likely to fail to acquire a measurement value of the measuring instrument 4 due to influence of, for example, reflection on the setting sun.

In the case of the data collection in a constant cycle, it is possible to consider data collection at a collection timing 41 (see FIG. 5A) in which acquisition of measurement data is always successful and at a collection timing 42 (see FIG. 5B) in which acquisition of measurement data always fails. In the collection timing 41 where acquisition of measurement data is always successful, it is difficult to detect (discover) the time in which data collection fails in one day. Further, in the collection timing 42 in which acquisition of measurement data always fails, it is conceivable that acquisition of the measurement data is successful sometime by repeating retry in the constant cycle.

However, if retry caused by data collection failure frequently occurs until acquisition of measurement data is successful, communication by the multi-hop wireless network 1 and an energy loss by the reading device 14 increase. Thus, it is desirable not to re-acquire measurement data from the wireless slave station 13 from which acquisition of measurement data has been failed, in consideration of an energy loss of an autonomous power source particularly in a system using a self-sustaining power source, such as a battery, as a power source for the wireless slave station 13 and the reading device 14.

However, a measurement target is not monitored if the retry of acquisition of measurement data is not performed due to presence of the timing in which data collection always fails. Therefore, in the present embodiment, the retry (re-acquisition of measurement data) caused by an acquisition error of measurement data (a measurement value) by the reading device 14 is avoided in a time zone in which measurement data is non-acquirable in order to monitor the measurement target. Hereinafter, Examples for avoiding retry in the time zone in which measurement data is non-acquirable will be specifically described.

Example 1

Example 1 is an example in the case of data collection in which a collection schedule is a cycle different from the 24-hour cycle. FIG. 6 is an example of a timing chart for describing an operation of an automatic inspection system according to Example 1.

In Example 1, as an example, the data collection device 15 instructs the wireless master station 11 to collect data in accordance with a collection schedule in a constant cycle of 23 hours. Further, the time at which acquisition of measurement data fails is set to, for example, 16 o'clock for the reason described above.

In the case of Example 1, it is conceivable that collection timings 51 and 53 at which acquisition of measurement data is always successful and a collection timing 52 at which acquisition of measurement data always fails are mixedly present, for example, during data collection cycles for three days. In such a case, it is possible to detect (discover) a time zone in which acquisition of measurement data fails in one day, that is, a time zone in which measurement data is non-acquirable by continuing the data collection.

Therefore, data collection is continued in a cycle different from the 24-hour cycle (in this example, 23-hour cycle) in Example 1 to find the time zone in which acquisition of measurement data fails. Further, it is configured to skip (avoid) re-acquisition of measurement data only in the time zone (time zone in which measurement data is non-acquirable) in which acquisition of measurement data fails. As a result, it is possible to reduce the energy loss of the autonomous power source caused by acquisition of measurement data and retry. Further, the data collection timing is always different from the previous collection timing, and thus, an acquisition failure rate is averaged as compared with the constant cycle collection at a fixed time according to the 24-hour cycle. As a result, it is possible to grasp that a cause in the case where the constant cycle collection fails continuously a plurality of times does not depend on a temporal change.

Figure 7:
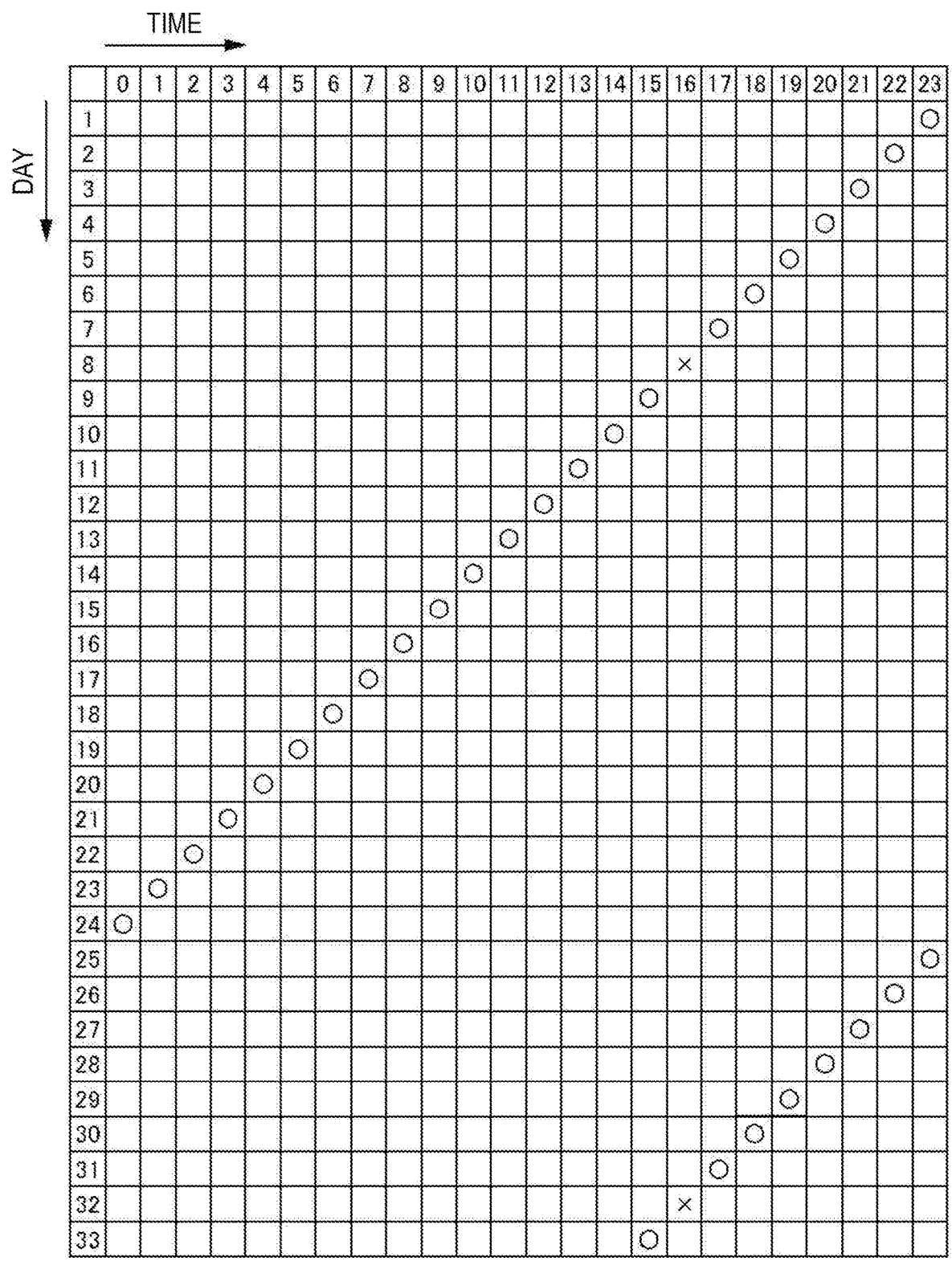
FIG. 7 is an example of an explanatory diagram of a method for specifying a time zone in which measurement data is non-acquirable.

Here, a method for specifying (detecting) the time zone in which measurement data is non-acquirable will be described with reference to FIG. 7. FIG. 7 is an example of an explanatory diagram of the method for specifying the time zone in which measurement data is non-acquirable. In this example, the time at which measurement data acquisition fails is set to, for example, 16 o'clock.

When data collection is continued in a cycle (in this example, 23-hour cycle) different from the 24-hour cycle, it is possible to grasp the time zone in which acquisition of measurement data fails, in the example of FIG. 7, a time zone with a mark x (that is, the time zone at 16 o'clock). Further, when performing acquisition of measurement data and retry thereafter, the acquisition of measurement data is skipped only the time zone in which acquisition of measurement data fails, in the example of Example 1, a time zone in the collection timing 52 illustrated in FIG. 6. As a result, it is possible to suppress the increase in the energy loss caused by data collection failure.

Example 2

Figure 8:
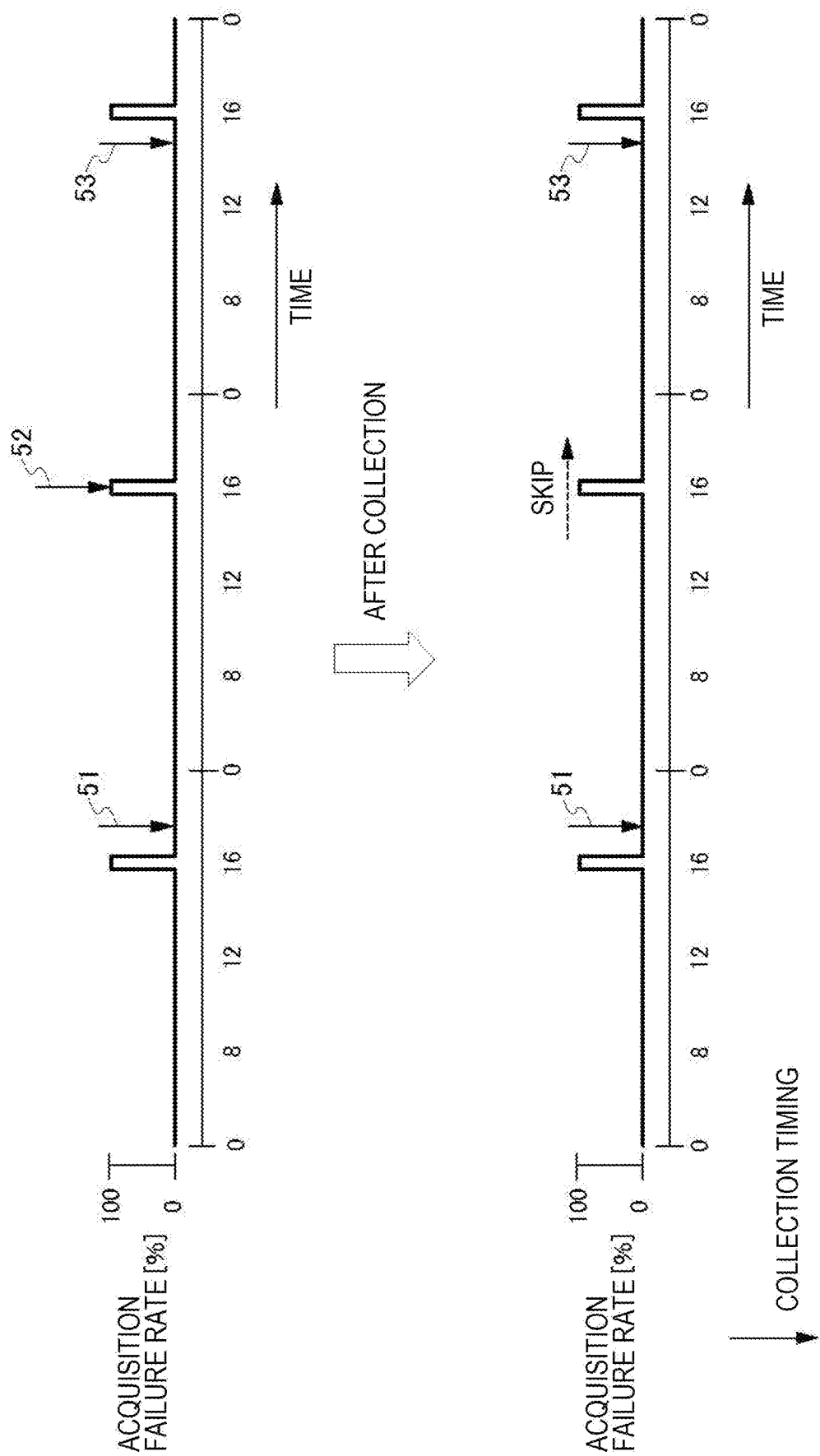
FIG. 8 is an example of a timing chart for describing an operation of an automatic inspection system according to Example 2.

Example 2 is an example of avoiding (stopping) retry in a time zone in which measurement data is non-acquirable, with respect to the wireless slave station 13 from which data collection has failed. FIG. 8 is an example of a timing chart for describing an operation of an automatic inspection system according to Example 2.

In Example 2, it is possible to consider a case where data collection has failed despite repetition of retry in a constant cycle in the collection timing 52 in which data collection always fails. The data collection device 15 determines that the possibility of successfully acquiring measurement data is low until any cause (for example, influence such as reflection by the setting sun) is removed even when retry is performed more than a plurality of times based on accumulated data in the error recording unit 152.

In this manner, the data collection device 15 skips and does not execute retry in the collection timing 52 in which data collection always fails (that is, the time zone in which measurement data is non-acquirable) with respect to the wireless slave station 13 from which acquisition of measurement data has failed and which has been determined that the possibility of successfully collecting data is low until the cause of the failure is removed, As a result, it is possible to reduce the energy loss caused by the data collection failure in the wireless slave station 13 from which acquisition of measurement data has failed.

Figure 9:
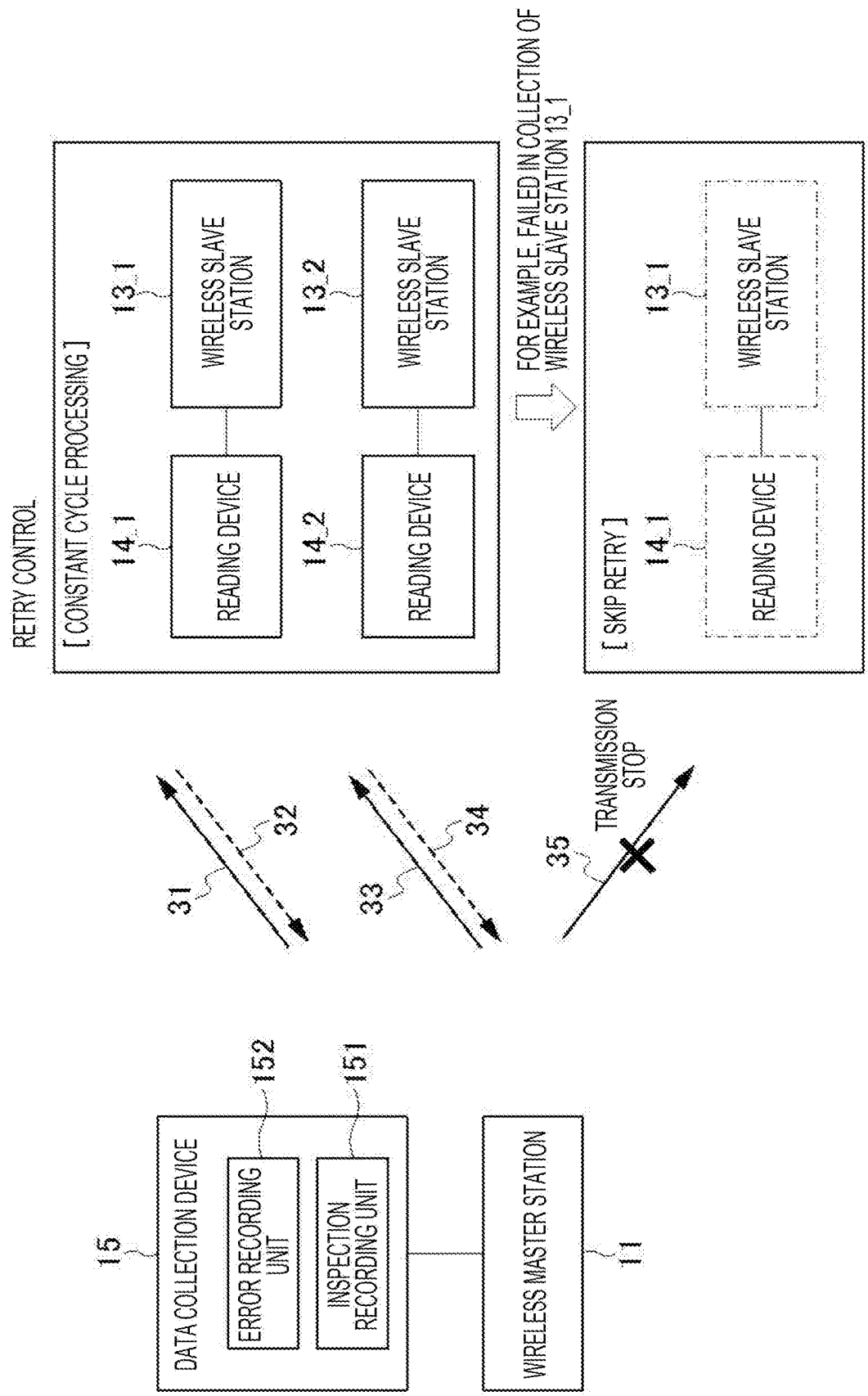
FIG. 9 is an example of an operation explanatory diagram of the automatic inspection system according to Example 2.

A description will be given regarding the above-described retry control process in the time zone in which measurement failure frequently occurs (that is, the time zone during which measurement data is non-acquirable) based on the collected information with reference to FIG. 9. FIG. 9 is an example of an operation explanatory diagram of the automatic inspection system according to Example 2.

As a specific example, the data collection device 15 determines that data collection failure frequently occurs in the wireless slave station 13_1 at a data collection timing of a current constant cycle (the collection timing illustrated in FIG. 8). Then, the data collection device 15 saves the response 34 of the wireless slave station 13_2 that there is no failure in acquisition of measurement data, in the inspection recording unit 151 and saves the response 32 of the wireless slave station 13_1 that acquisition of measurement data has failed, in the error recording unit 152.

Further, the data collection device 15 refers to the accumulated data in the error recording unit 152, stops transmitting the data transmission request 35 to the wireless slave station 13_1 if data collection failure frequently occurs at the data collection timing of the current constant cycle so as not to perform retry of the acquisition of measurement data with respect to the wireless slave station 13_1. As a result, the retry with respect to the wireless slave station 13_1 is skipped, and thus, it is possible to reduce the energy loss caused by the data collection failure in the wireless slave station 13 from which acquisition of measurement data has failed.

Example 3

Figure 10:
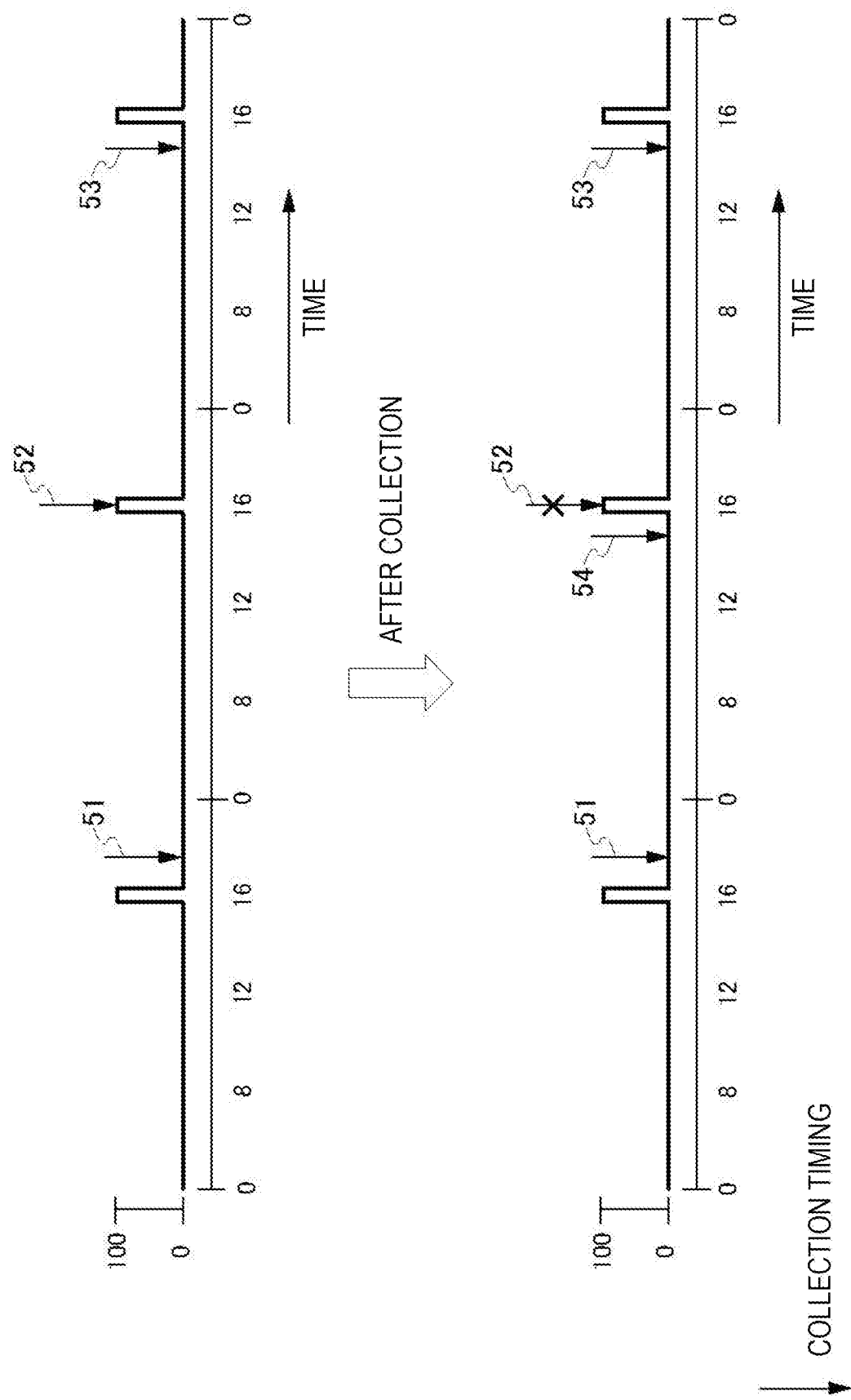
FIG. 10 is an example of a timing chart for describing an operation of an automatic inspection system according to Example 3.

Example 3 is an example in which a data collection plan is changed for the wireless slave station 13 that has failed in data collection. FIG. 10 is an example of a timing chart for describing an operation of an automatic inspection system according to Example 3.

It is considered that a case where acquisition of measurement data in a constant cycle is likely to fail in the data collection device 15 at the collection timing 52 in which data collection always fails based on the accumulated data in the error recording unit 152. In this case, it is conceivable that acquisition of measurement data fails until any cause (for example, the influence such as reflection by the setting sun) is removed even if the acquisition of measurement data in the constant cycle is performed.

Therefore, the data collection device 15 changes a data collection plan and acquires measurement data when it is anticipated that acquisition of measurement data in a constant cycle will fail. Specifically, the plan is changed to a collection timing 54 earlier by one hour than the collection timing 52 in which the data collection always fails (the plan is advanced by one hour). As a result, it is possible to reduce the possibility of failing to acquire measurement data in the wireless slave station 13 from which acquisition of measurement data has failed, and thus, it is possible to reduce the energy loss caused by the data collection failure.

Figure 11:
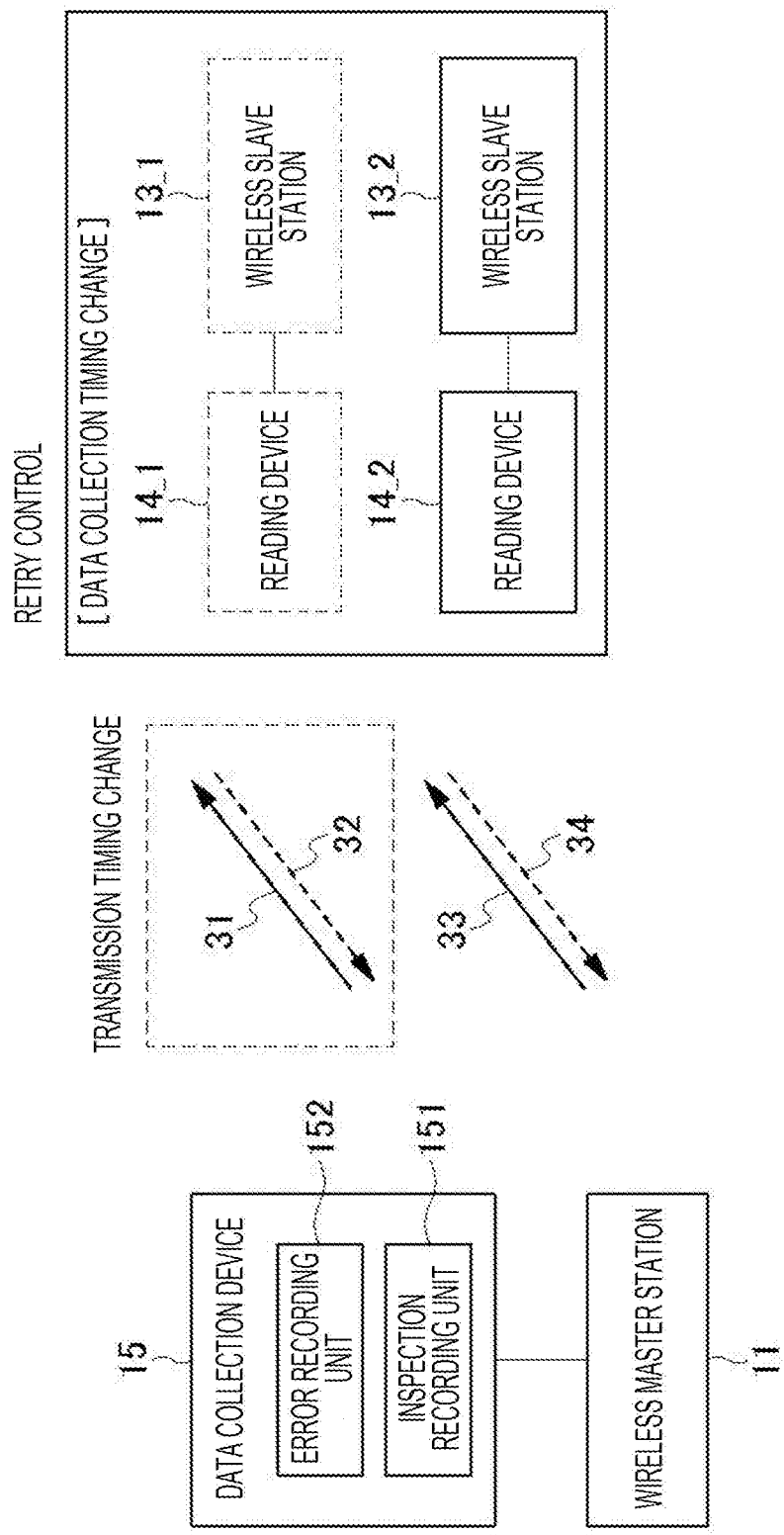
FIG. 11 is an example of an operation explanatory diagram of the automatic inspection system according to Example 3.

A description will be given regarding the above-described retry control process in the time zone in which measurement failure frequently occurs (that is, the time zone during which measurement data is non-acquirable) based on the collected information with reference to FIG. 11. FIG. 11 is an explanatory diagram of an operation of the automatic inspection system according to the Example 3.

As a specific example, the data collection device 15 determines that data collection failure frequently occurs in the wireless slave station 13_1 at a data collection timing of a current constant cycle (the collection timing 52 illustrated in FIG. 10). Then, the data collection device 15 refers to the accumulated data in the error recording unit 152, and changes the data collection plan in the constant cycle with respect to the wireless slave station 13_1 if data collection failure frequently occurs at the data collection timing of the current constant cycle.

Due to this change of data collection plan, the data collection device 15 instructs the wireless master station 11 to collect data from the wireless slave station 13_1 in accordance with a collection schedule based on the changed data collection plan. When receiving this instruction, the wireless master station 11 transmits a request 31 of data transmission to the wireless slave station 13_1. As a result, a transmission timing of the request 31 from the wireless master station 11 to the wireless slave station 13_1 is changed along with the change of the data collection plan.

In this manner, the data collection plan is changed with respect to the wireless slave station 13_1 for which the failure in acquisition of measurement data frequently occurs to perform acquisition of measurement data at the collection timing 54, which is different from and earlier by, for example, one hour than the original collection timing 52, so that it is possible to reduce the energy loss caused by the data collection failure.

[Modifications]

Incidentally, the present invention is not limited to the above-described respective Examples, and includes various modifications. For example, the above-described respective Examples have been described in detail in order to describe the present invention in an easily understandable manner, and are not necessarily limited to one including the entire configuration that has been described above. Further, one means of a certain Example can be substituted by configurations of another Example, and further, to a configuration of a certain Example, a configuration of another Example can be added. Further, with respect to one means of configurations of each Example, addition, deletion, or substitution of other configurations can be made.

REFERENCE SIGNS LIST 1 multi-hop wireless network
2 network
3 aggregation server
4(4_1 to 4_n) measuring instrument
10 automatic inspection system
11(11_1 to 11_k) wireless master station (base station)
12(12_1 to 12_m) wireless slave station (relay station)
13(13_1 to 13_n) wireless slave station (terminal station)
14(14_1 to 14_n) reading device
15 data collection device

The invention claimed is:

1. An automatic inspection system using a wireless network which includes a wireless slave device having a reading device that acquires a physical quantity to be inspected and a wireless master device that receives measurement data of the physical quantity acquired by the reading device from the wireless slave device by wireless communication,
the automatic inspection system comprising a data collection device that collects the measurement data from the wireless slave device via the wireless master device in a constant cycle and detects a time zone in which the measurement data is non-acquirable by the reading device based on a result of the collection,
wherein the wireless master device performs control to avoid the wireless slave device from re-acquisition of the measurement data in the non-acquirable time zone based on a result of the detection of the non-acquirable time zone.

2. The automatic inspection system according to claim 1, wherein
the data collection device sets a cycle different from a 24-hour cycle as the constant cycle and continues to collect the measurement data in the cycle so as to specify a time zone in which the measurement data is non-acquirable, and
the wireless master device performs control to skip re-acquisition of the measurement data in the non-acquirable time zone specified by the data collection device with respect to the wireless slave device that has failed in collecting the measurement data.

3. The automatic inspection system according to claim 1, wherein
the wireless master device performs control so as not to perform re-acquisition of the measurement data in the non-acquirable time zone with respect to the wireless slave device that has performed re-acquisition of the measurement data more than a predetermined number of times.

4. The automatic inspection system according to claim 1, wherein
the wireless master device performs control so as to perform re-acquisition of the measurement data at a timing that avoids the time zone in which the measurement data is non-acquirable with respect to the wireless slave device that has failed in collecting the measurement data.

5. An automatic inspection method using a wireless network which includes a wireless slave device having a reading device that acquires a physical quantity to be inspected and a wireless master device that receives measurement data of the physical quantity acquired by the reading device from the wireless slave device by wireless communication,
the automatic inspection method comprising:
collecting the measurement data from the wireless slave device via the wireless master device in a constant cycle and detecting a time zone in which the measurement data is non-acquirable by the reading device based on a result of the collection; and
avoiding the wireless slave device from re-acquisition of the measurement data in the non-acquirable time zone by the wireless master device based on a result of the detection of the non-acquirable time zone.

* * * * *